March 16, 1971  H. G. WEZEL  3,570,124
ANIMAL SKINNING APPARATUS
Filed April 1, 1969

INVENTOR
HANS GEORG WEZEL

March 16, 1971  H. G. WEZEL  3,570,124
ANIMAL SKINNING APPARATUS
Filed April 1, 1969  2 Sheets-Sheet 2

INVENTOR
HANS GEORG WEZEL

BY  Michael S. Striker
ATTORNEY

United States Patent Office 3,570,124
Patented Mar. 16, 1971

3,570,124
ANIMAL SKINNING APPARATUS
Hans Georg Wezel, Maulbronn, Wurttemberg, Germany, assignor to Schmid & Wezel, Maulbronn, Wurttemberg, Germany
Filed Apr. 1, 1969, Ser. No. 811,745
Claims priority, application Germany, June 25, 1968, Sch 45,103
Int. Cl. B26b 19/12
U.S. Cl. 30—208        10 Claims

ABSTRACT OF THE DISCLOSURE

An animal skinning apparatus has a support and a cover between which there are located a pair of coaxial toothed cutter wheels which are rotatably carried by the support. The sides of the support and of the cover which face the cutter wheels are provided with grooves extending circumferentially of the cover and support, and sealing strips are located in these grooves and slidingly engage the respective cutter wheels to prevent entry of contaminants into the interior of the apparatus. Portions of the cutter wheels extend outwardly beyond the support and cover for cutting purposes.

BACKGROUND OF THE INVENTION

The present invention relates generally to animal skinning apparatus, and more particularly to apparatus for skinning cattle and other species of animals. Still more particularly the invention relates to power-driven skinning apparatus utilizing coaxial toothed cutter wheels.

Various types of skinning apparatus for the above purpose are already well known. In accordance with one such known type of skinning apparatus, described in more detail in U.S. Pat. No. 3,435,522, issued to Walter Wezel et al. under the title "Apparatus for Skinning Animals," and to which reference may be had for further details, two coaxial toothed cutter wheels are mounted in the housing comprising a support and a cover between which the cutter wheels rotate and from which they project in part so that their toothed periphery may come in contact with the animal to be skinned. The housing further comprises an internal chamber located between the side of the support which faces away from the cutter wheels and an additional cover, and in this chamber there are located the drive instrumentalities which drive the cutter wheels for rotation. Thus, the support constitutes a barrier which prevents the intrusion of contaminants such as blood, fatty acids, hair and the like into the drive components located in the internal chamber because all such foreign matter would quickly damage the sensitive parts of the drive components, such as the transmission, by corrosion and the like. However, while the aforementioned construction prevents the intrusion of foreign matter into the chamber containing the drive components, it does not prevent the intrusion of foreign matter into the space between the support and the first cover wherein the toothed cutter wheels are rotatably mounted. While it is evident that cleaning of the apparatus after use is ordinarily a part of the work routine, there are nevertheless occasions when such cleaning is either forgotten or willfully omitted by the operator. In that case the blood, fragments of hair and skin, fatty acids and other foreign matter which has entered will tend to cake and to prevent the cutter wheels from rotating when the apparatus is again started up. Evidently, this is likely to damage the drive.

It is, accordingly, desirable to overcome this disadvantage.

SUMMARY OF THE INVENTION

It is a general object of the invention to overcome the aforementioned disadvantage.

A more particular object of the invention is to provide an animal skinning apparatus wherein the intrusion of blood, fragments of hair and skin, fatty acids and other foreign matter into the space wherein the cutter wheels are rotatably mounted, is prevented or at least reduced to the absolute possible minimum.

An additional object of the invention is to provide such an apparatus wherein cleaning is facilitated by the fact that less foreign matter is required to be removed as a result of the present invention and after use of the apparatus.

A concomitant object of the invention is to provide such an apparatus wherein the frictional resistance to rotation of the cutter wheels is reduced by the absence or reduction of foreign matter which can intrude.

In pursuance of the above objects, and of others which will become apparent hereinafter, one feature of my invention resides in the provision of an apparatus for skinning animals which comprises a support having an exposed side on which a pair of coaxial toothed cutter wheels is rotatably mounted in overlying relationship. A cover overlies portions of the cutter wheels and is secured to the support with its inner side facing the cutter wheels. Groove means is provided in the circumferential marginal portions of the exposed side of the support as well as of the inner side of the cover. Sealing means is received in the groove means and is at least in part in sealing engagement with the respective cutter wheel located adjacent one or the other side, and thus prevents entry of contaminants beyond the respective groove into the interior of the apparatus.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 4:
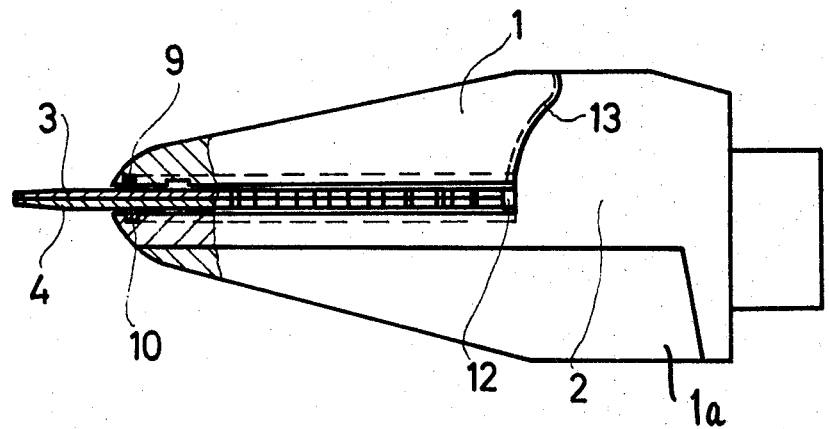
FIG. 4 is a partly sectioned side elevation of the apparatus shown in FIG. 1, in a somewhat diagrammatic illustration.

Discussing the apparatus in detail, it will be seen that I provide a housing consisting of a support 2, a first cover 1 and a second cover 1a, as shown in FIG. 4. The second cover 1a defines with the support 2 an internal chamber in which the drive for the toothed coaxial rotary cutter wheels 3 and 4 is located, in the manner which is clearly described in the aforementioned U.S. patent. This does not form a part of the invention and is therefore not illustrated or discussed in detail.

Figure 1:
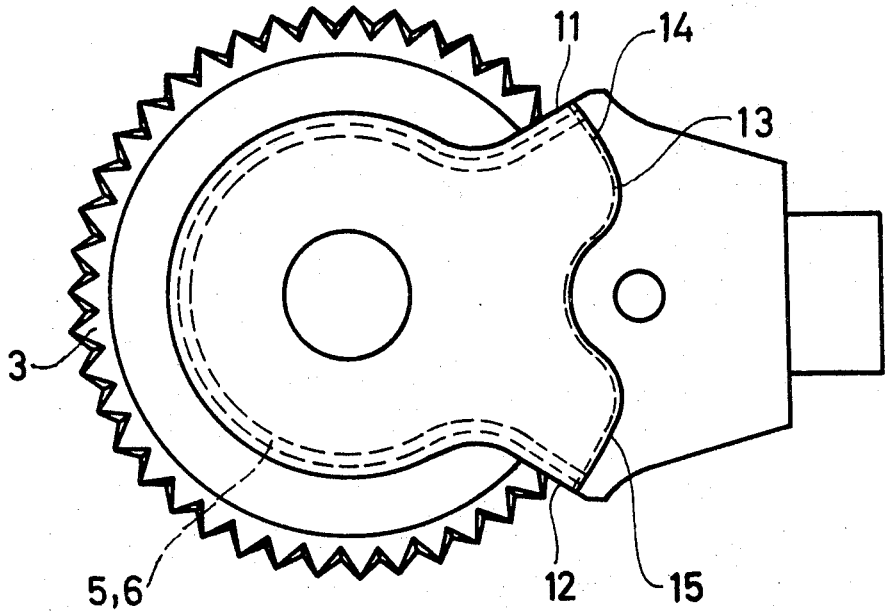
FIG. 1 is a fragmentary top-plan view of an animal skinning apparatus embodying the invention.

Mounted on the exposed side of the support 2, that is the side facing the cover 1, are the cutter wheels 3 and 4 which are coaxial and toothed, as evident from FIGS. 1 and 4 in particular. Their marginal portions extend outwardly beyond the exposed side of the support 2 and the inner side of the cover 1 and approximately 270° of the circumference of the cutter wheels 3 and 4 is thus exposed, as shown in FIG. 1. The cutters 3 and 4 separate the animal skin in response to oscillation about their own axes; oscillation which is caused by two motion-transmitting straps which form part of a transmission accommodated in the chamber defined between the cover 1a and the support 2. Details concerning this motion-transmitting drive are set forth in the aforementioned U.S. patent.

Figure 2:
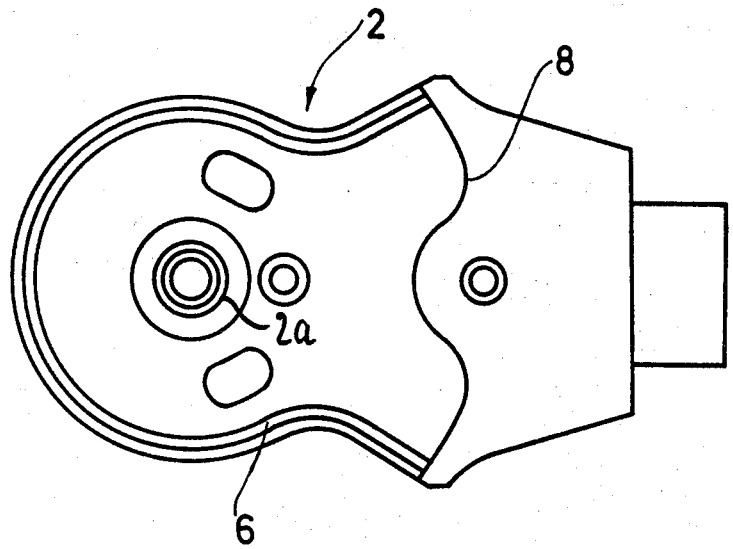
FIG. 2 is a view similar to FIG. 1 but with the cover and the cutter wheels removed.

Reference numeral 2a in FIG. 2 identifies a bushing or sleeve which is secured in suitable manner in the support 2 and on which the cutter wheels 3, 4 are mounted for rotation; the cover 1 is secured in suitable manner, for instance by a screw, to the bushing 2a.

It will be appreciated that foreign matter can enter into the interior of the apparatus between the cutter wheel 3 and the inner side of the cover 1 on the one hand, and between the cutter wheel 4 and the exposed side of the support 2 on the other hand. Furthermore, foreign matter can also enter at the locations 12 (compare FIGS. 1 and 4) where the members 1 and 2 extend outwardly beyond the periphery of the cutter wheels 3 and 4.

Figure 3:
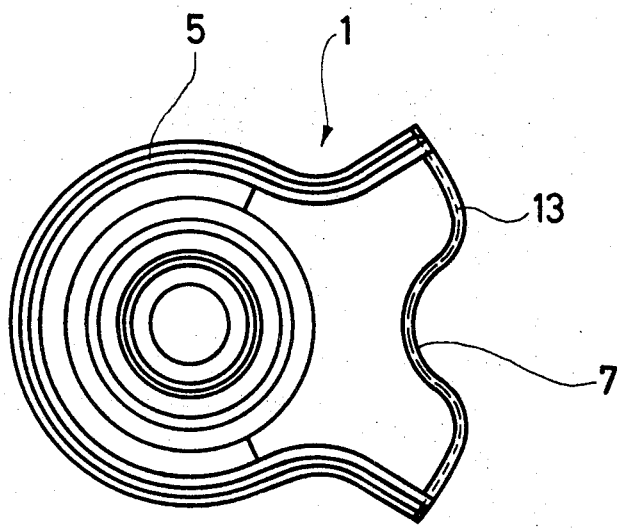
FIG. 3 is a bottom plan view of the cover shown in FIG. 1.

In accordance with my invention I provide the inner side of the cover 1, which latter is shown in a bottom-plan view in FIG. 3, and the exposed side of the support 2, which latter is shown in top-plan view in FIG. 2, with respective grooves 5 and 6. It will be seen that these grooves extend along the margins of the respective sides, but that they are not circumferentially complete. This is to say that the groove 5 extends from one end of the edge face 7 connecting the inner and outer sides of the cover 1, circumferentially of the inner side of the cover 1 to the other opposite end of the edge face 7, as shown in FIG. 3. Similarly, the groove 6 extends from one end of the edge face 8 which projects upwardly from the exposed side of the support 2, circumferentially of this exposed side to the other opposite end of the edge face 8. This is clearly shown in FIG. 3 with respect to the cover 1 and in FIG. 2 with respect to the support 2.

The groove 5 accommodates an elongated sealing strip 9 and the groove 6 similarly accommodates an elongated sealing strip 10. In each case, the respective sealing strip 9, 10 extends slightly beyond the respective groove, that is beyond the respective side in which the groove is provided. The extent to which the sealing strips 9 and 10 extend from their respective grooves 5 and 6 is so selected that the sealing strips 9 and 10 will respectively be in sliding engagement with the cutter wheels 3 and 4. They thus provide a seal against the intrusion of foreign matter inwardly beyond the grooves 5 and 6.

Advantageously the sealing strips 9 and 10 will consist of synthetic plastic material, preferably synthetic plastic material which is resistant to wear resulting from the rotational sliding movement of the cutters 3, 4 with reference to the sealing strips, and preferably the synthetic plastic material should be of the type having a low coefficient of friction. A variety of such synthetic plastic material is suitable for the purpose and well known to those skilled in the art. I prefer that the sealing strips 9, 10 be of polygonal cross-sectional configuration, with the grooves 5 and 6 being configurated correspondingly, although other cross-sectional configurations are also suitable.

It is evident from FIG. 4 that the edge faces 7 of cover 1 and 8 of support 2 are juxtaposed with one another when the cover is secured on the support. To prevent the intrusion of foreign matter between the edge faces 7 and 8 I provide one of them—in the illustrated embodiment the edge face 7—with a further groove 13 which extends along the edge face 7 proximal to the outer side of the cover 1, as indicated by reference numeral 15. An additional sealing strip 14, which may consist of the same material as the sealing strips 9 and 10, is received in the groove 13 and sealingly engages the edge face 8.

As already indicated before, the fact that the exposed side of the support 2 and the inner side of the cover 1 extend outwardly beyond the periphery of the cutter wheels 3 and 4, as illustrated in FIGS. 1 and 4, provides openings 11, 12 between the end portions of the grooves 5 and 6, and correspondingly between the end portions of the sealing strips 9 and 10 received in these grooves, because in the region of these openings 11, 12 the cutter wheels 3, 4 are absent and therefore cannot sealingly engage the sealing strips 9 and 10. To prevent intrusion of foregn matter through these openings 11, 12 I may provide the end portions of the sealing strips 9 and 10—that is the portions of these sealing strips which are located in the grooves at the regions indicated by 11 and 12 in FIGS. 1 and 4—of greater thickness than the remainder of the sealing strips 9 and 10. This thickness will then be so selected that these portions of greater thickness will engage one another thereby prevent intrusion of foreign matter in the region of these openings 11 and 12.

It will be evident that by resorting to my novel invention the intrusion of foreign matter and thus eliminates the possibility that caking and/or jamming of such foreign matter in the area between the cutter wheels 3, 4 and the cover 1 and support 2, respectively, can prevent rotation of the cutter wheels 3, 4 with resultant damage to the drive. This, of course, is highly advantageous, it being evident that in cases where the protection according to the present invention is not provided and where the drive was able to overcome the caking and rotate the cutter wheels despite the presence of the foreign matter, this nevertheless placed an undue stress on the drive resulting in increased wear and tear which is now eliminated. Moreover, my present invention clearly facilitates cleaning of the apparatus because when the cover 1 is removed there will now be either no foreign matter or only negligible quantities thereof present which require removal. Finally, the absence of foreign matter of course reduces the friction which must be overcome by the drive in rotating the cutter wheels 3, 4 and this again is advantageous because it results in a decrease of the strain placed on the drive.

It will be understood that each of the elements described above, or two or more together, may also find a useful application in other types of constructions differing from the types described above.

While the invention has been illustrated and described as embodied in an animal skinning apparatus, it is not intended to be limited to the details shown, since various modifications and structural changes may be made without departing in any way from the spirit of the present invention.

I claim:

1. In an apparatus for skinning animals, a combination comprising a support having an exposed side; a pair of coaxial toothed cutter wheels rotatably carried by said support overlying said exposed side; a cover overlying portions of said cutter wheels, said cover being secured to said support and having an inner side facing said cutter wheels; groove means provided in the circumferential marginal portions of said exposed side of said support and said inner side of said cover, respectively; and sealing means received in said groove means and being at least in part in sealing engagement with the respective cutter wheel, for preventing entry of contaminants beyond said groove means into the interior of said apparatus.

2. In an apparatus as defined in claim 1, said sealing means being in sliding engagement with said cutter wheels so that the latter are free to rotate with reference to said sealing means.

3. In an apparatus as defined in claim 2, said sealing means comprising elongated sealing strips of synthetic plastic material.

4. In an apparatus as defined in claim 3, said synthetic plastic material being a material resistant to wear resulting from sliding engagement of the rotating cutter wheels.

5. In an apparatus as defined in claim 4, said sealing strips being of polygonal cross-sectional configuration.

6. In an apparatus as defined in claim 2, said support including a transverse wall extending upwardly from said exposed side along one edge thereof and having a first edge face, and said cover comprising a second edge face extending along one elge of said inner side and being juxtaposed with said first edge face; said groove means including a first and a second circumferentially incomplete groove each provided in one of said sides and each extending from one location adjacent the associated edge face circumferentially of the respective side to another transversely spaced location of the same edge face, and at least one additional groove provided in one of said edge faces and extending between said locations, said sealing means also being received in said additional groove and sealingly engaging the other of said edge faces.

7. In an apparatus as defined in claim 6, said cover also having an outer side spaced from said inner side, said second edge face connecting said outer and inner sides, and said additional groove being provided in said second edge face and extending along the same between said locations proximal to said outer side.

8. In an apparatus as defined in claim 6, said first and second grooves having end portions adjacent said first edge face and extending outwardly beyond the periphery of the respective cutter wheels; and said sealing means comprising sealing strips received in said first and second grooves and having in the region of said end portions a thickness greater than in the remainder of said first and second grooves, so that said sealing strips sealingly engage one another in the region of said end portions which extend outwardly beyond the periphery of said cutter wheels.

9. In an apparatus as defined in claim 4, wherein said sealing strips are of rectangular cross-sectional configuration.

10. In an apparatus as defined in claim 4, said synthetic plastic material having a low coefficient of friction.

References Cited

UNITED STATES PATENTS

| | | | |
|---|---|---|---|
| 3,176,397 | 4/1965 | Schuhmann | 30—219 |
| 3,346,956 | 10/1967 | Wezel | 30—219X |
| 3,435,552 | 4/1969 | Wezel | 30—219 |

LESTER M. SWINGLE, Primary Examiner

J. C. PETERS, Assistant Examiner

U.S. Cl. X.R.

30—219